United States Patent
Ito

(10) Patent No.: US 11,099,799 B2
(45) Date of Patent: Aug. 24, 2021

(54) METHOD FOR CONTROLLING DISPLAY DEVICE, DISPLAY DEVICE, METHOD FOR CONTROLLING DISPLAY SYSTEM, AND DISPLAY SYSTEM

(71) Applicant: SEIKO EPSON CORPORATION, Tokyo (JP)

(72) Inventor: Shigehito Ito, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/702,725

(22) Filed: Dec. 4, 2019

(65) Prior Publication Data

US 2020/0183633 A1 Jun. 11, 2020

(30) Foreign Application Priority Data

Dec. 5, 2018 (JP) .............................. JP2018-227898

(51) Int. Cl.
*G06F 3/14* (2006.01)
*G06F 3/0481* (2013.01)

(52) U.S. Cl.
CPC .......... *G06F 3/1423* (2013.01); *G06F 3/0481* (2013.01)

(58) Field of Classification Search
CPC .... G06F 3/0481; G06F 3/1423; G06F 3/1454;
G06F 3/165; G11B 27/34; H04N 21/4122; H04N 21/431; H04N 21/435; H04N 21/43637; G09G 2370/22
See application file for complete search history.

(56) References Cited

U.S. PATENT DOCUMENTS

| 2012/0262370 A1* | 10/2012 | Ko | G06F 3/0482 345/157 |
| 2013/0278484 A1* | 10/2013 | Hwang | G06F 3/1423 345/2.3 |
| 2017/0272265 A1* | 9/2017 | Okazato | H04L 12/1831 |
| 2020/0125224 A1* | 4/2020 | Shim | G06F 3/0346 |

FOREIGN PATENT DOCUMENTS

| JP | 2005-18607 A | 1/2005 |
| JP | 2010-41238 A | 2/2010 |
| JP | 2012-84045 A | 4/2012 |

* cited by examiner

*Primary Examiner* — Nelson M Rosario
(74) *Attorney, Agent, or Firm* — Dority & Manning, P.A.

(57) ABSTRACT

A method for controlling a display device includes: receiving history information about an operation to a first operation image for a setting of the display device, from a terminal device displaying the first operation image; generating display information used to display a second operation image for a setting of the display device, using the history information; and transmitting the display information to the terminal device.

9 Claims, 5 Drawing Sheets

METHOD FOR CONTROLLING DISPLAY DEVICE, DISPLAY DEVICE, METHOD FOR CONTROLLING DISPLAY SYSTEM, AND DISPLAY SYSTEM

The present application is based on, and claims priority from JP Application Serial Number 2018-227898, filed Dec. 5, 2018, the disclosure of which is hereby incorporated by reference herein in its entirety.

BACKGROUND

1. Technical Field

The present disclosure relates to a method for controlling a display device, a display device, a method for controlling a display system, and a display system.

2. Related Art

A system that can make various settings of an apparatus such as a projector, using a terminal device communicably coupled to the apparatus, is known. For example, in a system described in JP-A-2012-84045, a setting item of print processing by a printer is displayed on a display of a personal computer. In this system, an information management server is communicably coupled to each of the personal computer and the printer. The information management server manages the frequency of use of a setting item of the print processing by the printer. The personal computer acquires information including the frequency of use from the information management server and decides an arrangement of a displayed setting item, based on the information.

However, the system described in JP-A-2012-84045 has a problem in that its configuration is complicated since the information management server is needed as well as the printer and the personal computer.

SUMMARY

A method for controlling a display device according to an aspect of the present disclosure includes: receiving history information about an operation to a first operation image for a setting of the display device, from a terminal device displaying the first operation image; generating display information used to display a second operation image for a setting of the display device, using the history information; and transmitting the display information to the terminal device.

A display device according to an aspect of the present disclosure includes: a receiving unit receiving history information about an operation to a first operation image for a setting of the display device, from a terminal device displaying the first operation image; a generation unit generating display information used to display a second operation image for a setting of the display device, using the history information; and a transmitting unit transmitting the display information to the terminal device.

A method for controlling a display system according to an aspect of the present disclosure includes: causing a display device to receive history information about an operation to a first operation image for a setting of the display device, from a terminal device displaying the first operation image; causing the display device to generate display information used to display a second operation image for a setting of the display device, using the history information; and transmitting the display information from the display device to the terminal device.

A display system according to an aspect of the present disclosure includes: a display device displaying an image on a display surface; and a terminal device communicably coupled to the display device and displaying a first operation image or a second operation image for a setting of the display device. The terminal device includes a storage unit storing history information about an operation to the first operation image. The display device includes: a receiving unit receiving the history information from the terminal device; a generation unit generating display information used to display the second operation image, using the history information; and a transmitting unit transmitting the display information to the terminal device.

DESCRIPTION OF EXEMPLARY EMBODIMENTS

Figure 1:
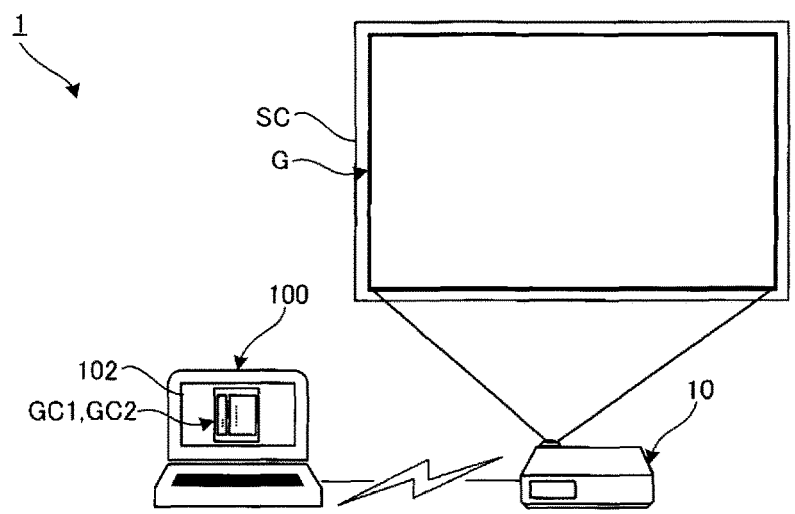
FIG. 1 schematically shows the external appearance of a display system according to a first embodiment.

Preferred embodiments of the present disclosure will now be described with reference to the accompanying drawings. In the drawings, the dimension and scale of each part are different from the actual dimension and scale where appropriate, and some parts are schematically shown in order to facilitate understanding. The scope of the present disclosure is not limited to the embodiments unless there is any particular description below that limits the present disclosure.

1. First Embodiment 1-1. Outline of Display System

FIG. 1 schematically shows the external appearance of a display system 1 according to a first embodiment. The display system 1 is a projection system. As shown in FIG. 1, the display system 1 includes a display device 10 and a terminal device 100.

The display device 10 is communicably coupled to the terminal device 100. This coupling may be wireless or wired. The display device 10 is a projector that can display an image G based on image information from the terminal device 100 or the like, onto a screen SC. The installation site of the screen SC may be, for example, a wall, floor, or table or the like. The installation site of the display device 10 may be, for example, a ceiling, wall, floor, table, or dedicated installation stand or the like.

The display device 10 can change a setting by an operation at the terminal device 100. The setting is not particularly limited but may be, for example, an image quality setting such as brightness, contrast, and color density, a video setting such as input resolution, aspect ratio, and display position, and other settings such as geometric distortion correction, zoom, and sound volume.

The terminal device 100 displays a first operation image GC1 or a second operation image GC2 based on display information from the display device 10. Each of the first operation image GC1 and the second operation image GC2 is an image that can accept an operation for a setting of the display device 10. As will be described in detail later, the second operation image GC2 includes a menu display based on a history of an operation to the first operation image GC1. Therefore, the operation load for a setting of the display device 10 is reduced.

In the example shown in FIG. 1, the terminal device 100 is a laptop personal computer having a display unit 102 that can display the first operation image GC1 or the second operation image GC2. The terminal device 100 is not limited to the example shown in FIG. 1, provided that the terminal device 100 can display the first operation image GC1 or the second operation image GC2. For example, the terminal device 100 may be a desktop personal computer, tablet terminal, or smartphone or the like. The terminal device 100 may also cause a separate device from the terminal device 100 or the display device 10 to display the first operation image GC1 or the second operation image GC2. The display unit 102 may be a separate unit from the terminal device 100.

1-2. Configuration of Display System

Figure 2:
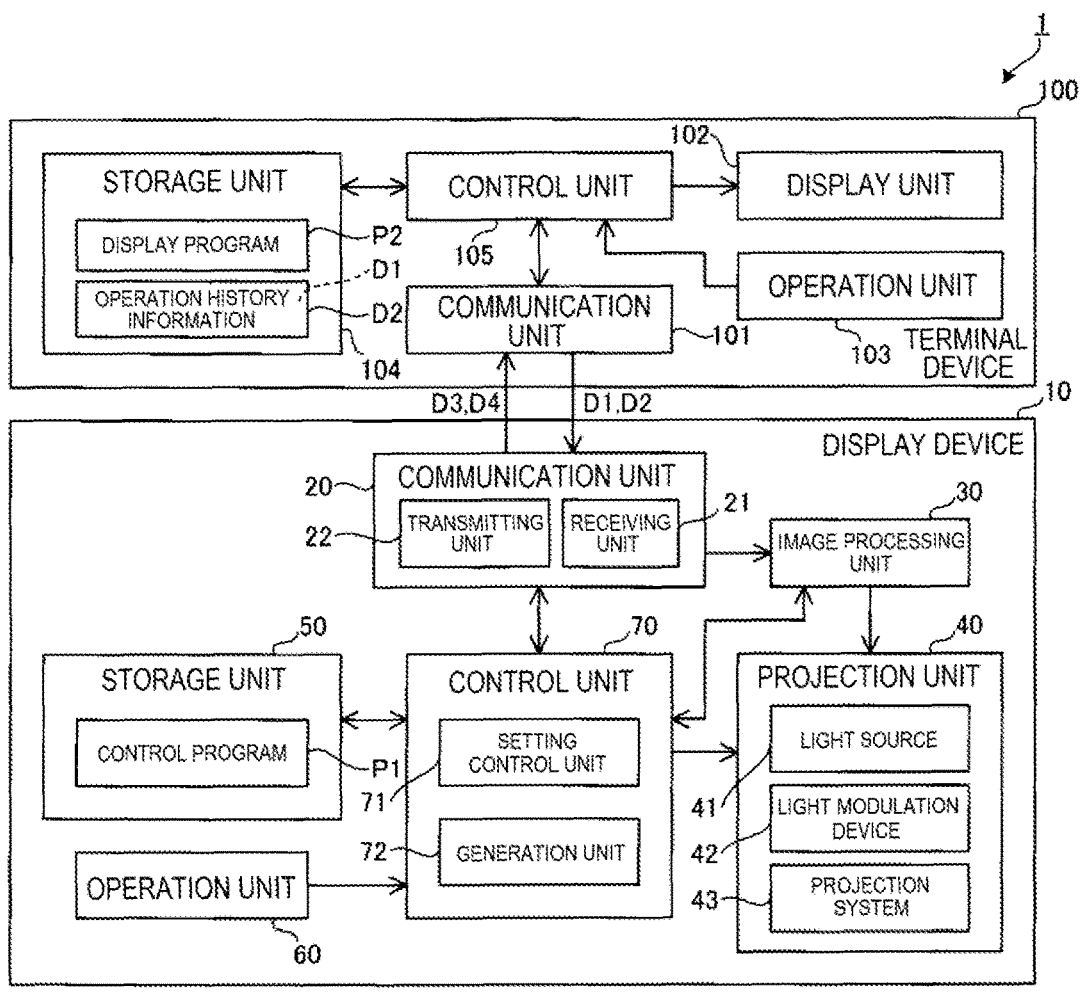
FIG. 2 shows the configuration of the display system according to the first embodiment.

FIG. 2 shows the configuration of the display system 1 according to the first embodiment. As shown in FIG. 2, the display device 10 has a communication unit 20, an image processing unit 30, a projection unit 40, a storage unit 50, an operation unit 60, and a control unit 70. These are communicably coupled to each other.

The communication unit 20 is an interface communicably coupled to the terminal device 100. For example, the communication unit 20 is a wireless or wired LAN (local area network) interface. The communication unit 20 may be an interface other than the LAN Interface, such as USB (universal serial bus) or HDMI (high-definition multimedia interface), provided that the communication unit 20 can be communicably coupled to the terminal device 100. The communication unit 20 may be coupled via other networks such as the internet. USB and HDMI are trademarks registered. The communication unit 20 may be arranged in the same casing as a main body of the display device 10 or may be arranged in another casing that is different from the casing of the main body. A device other than the terminal device 100 may be coupled to the communication unit 20.

The communication unit 20 has a function of receiving various kinds of information from the terminal device 100, and a function of transmitting various kinds of information to the terminal device 100. Therefore, the communication unit 20 has a receiving unit 21 and a transmitting unit 22 as functional units. The receiving unit 21 receives various kinds of information including image information, operation information D1 or operation history information D2 from the terminal device 100. The operation history information D2 is an example of history information. The transmitting unit 22 transmits various kinds of information including display information D3 or D4 to the terminal device 100. The operation information D1, the operation history information D2, and the display information D3 and D4 will be described in detail later.

The image processing unit 30 is a circuit performing necessary processing of the image information from the communication unit 20 and inputting the processed image information to the projection unit 40. The image processing unit 30 has, for example, a frame memory, not illustrated. The image processing unit 30 loads the image information into the frame memory, executes various kinds of processing such as resolution conversion, resizing, and distortion correction according to need, and inputs the processed image information to the projection unit 40.

The projection unit 40 is a projection device projecting image light and displaying the image G onto the screen SC, which is a display surface. The projection unit 40 has a light source 41, a light modulation device 42, and a projection system 43.

The light source 41 includes, for example, a halogen lamp, xenon lamp, ultra-high-pressure mercury lamp, LED (light-emitting diode), or laser light source or the like. The light source 41 emits, for example, each of red light, green light, and blue light, or emits white light. When the light source 41 emits white light, the light emitted from the light source 41 is reduced in unevenness in luminance distribution by an optical integration system, not illustrated, and is subsequently separated into red light, green light, and blue light by a color separation system, not illustrated, and becomes incident on the light modulation device 42. The light modulation device 42 includes three light modulation elements provided corresponding to the red light, green light, and blue light. Each of the three light modulation elements includes, for example, a transmission-type liquid crystal panel, reflection-type liquid crystal panel, or DMD (digital mirror device) or the like. The three light modulation elements modulate the red light, green light, and blue light, respectively, and generate image light of the respective colors. The image light of the respective colors generated by the light modulation device 42 is combined together into full-color image light by a light combining system, not illustrated. The projection system 43 projects the full-color image light to form an image on the screen SC. The projection system 43 is an optical system including at least one projection lens and may include a zoom lens or a focus lens or the like.

The storage unit 50 is a storage device storing a control program P1 executed by the control unit 70 and data processed by the control unit 70. The storage unit 50 includes, for example, a hard disk drive or semiconductor memory. Apart or the whole of the storage unit 50 may also be provided in a storage device outside the display device 10 or in a server or the like.

The operation unit 60 is a device accepting an operation by a user. For example, the operation unit 60 includes an operation panel and a remote control light receiving unit, not illustrated. The operation panel is provided at an outer casing of the display device 10 and outputs a signal based on an operation by the user. The remote control light receiving unit receives an infrared signal from a remote controller, not illustrated, decodes the infrared signal, and outputs a signal based on an operation on the remote controller.

The control unit 70 is a processing device having a function of controlling each part of the display device 10 and a function of processing various data. The control unit 70 includes, for example, a processor such as a CPU (central processing unit). The control unit 70 executes the control program P1 stored in the storage unit 50 and thus implements various functions including functional units described below. The control unit 70 may be formed of a single processor or a plurality of processors. A part or all of the functions of the control unit 70 may be implemented by hardware such as a DSP (digital signal processor), ASIC (application-specific integrated circuit), PLD (programmable logic device), or FPGA (field-programmable gate array). The control unit 70 may be integrated with the image processing unit 30.

The control unit 70 has a setting control unit 71 and a generation unit 72 as functional units. The setting control unit 71 executes various controls for various settings of the terminal device 100. Specifically, the setting control unit 71 can execute processing to cause the receiving unit 21 to receive the operation information D1 and the operation history information D2, described later, processing to cause the transmitting unit 22 to transmit the display information D3 or D4, and processing to set each part, based on the operation information D1, or the like. The generation unit 72 generates the display information D3 or D4. The display information D3 is information used to display the first operation image GC1. The display information D4 is information used to display the second operation image GC2. The format of each of the display information D3 and D4 is not particularly limited but may be, for example, the HTML (hyper text markup language) format. When each of the display information D3 and D4 is in the HTML format, an image based on the display information D3 or D4, that is, the first operation image GC1 or the second operation image GC2, can be displayed using a web browser at the terminal device 100. Also, for example, the generation unit 72 generates the display information D4 in the HTML format, using a CGI (common gateway interface) program.

The terminal device 100 has a communication unit 101, a display unit 102, an operation unit 103, a storage unit 104, and a control unit 105. These are communicably coupled to each other.

The communication unit 101 is an interface communicably coupled to the communication unit 20. For example, the communication unit 101 is configured similarly to the communication unit 20. The communication unit 101 transmits various kinds of information including the image information, the operation information D1 or the operation history information D2 to the display device 10. The communication unit 101 also receives various kinds of information including the display information D3 or D4 from the display device 10.

The display unit 102 displays various images under the control of the control unit 105. The display unit 102 is, for example, a display device including a display panel of various kinds such as a liquid crystal display panel or organic EL (electro-luminescence) display panel. In this example, the display unit 102 displays the first operation image GC1 based on the display information D3, or the second operation image GC2 based on the display information D4.

The operation unit 103 is an input device accepting an operation by the user. For example, the operation unit 103 includes a touch pad, a touch panel, or a pointing device such as a mouse. In this example, when the operation unit 103 includes a touch panel, the operation unit 103 may also function as the display unit 102. The operation unit 103 accepts an operation by the user. Specifically, the operation unit 103 accepts an operation for selecting a setting item included in the first operation image GC1 or the second operation image GC2 displayed by the display unit 102.

The storage unit 104 is a storage device storing a program such as an operating system and an application program executed by the control unit 105, and data processed by the control unit 105. The storage unit 104 includes, for example, a hard disk drive or semiconductor memory. The storage unit 104 may be provided in a storage device outside the terminal device 100 or in a server or the like.

In the storage unit 104, a display program P2 and the operation history information D2 are stored. The display program P2 causes the display unit 102 to display the first operation image GC1 or the second operation image GC2, using the display information D3 or D4 from the display device 10. For example, when each of the display information D3 and D4 is in the HTML format, the display program P2 is a web browser. The operation history information D2 is history information about an operation to the first operation image GC1 or the second operation image GC2 displayed at the terminal device 100. The operation history information D2 includes, for example, the operation information D1 and chronological information such as time information associated with the operation information D1. The operation information D1 is information about an operation to the first operation image GC1 or the second operation image GC2 displayed at the terminal device 100.

When the display program P2 is, for example, a web browser, the operation history information D2 is stored in the storage unit 104, using a web storage. In this case, for example, when an operation to the first operation image GC1 is carried out, a menu C2 can be immediately displayed additionally in the first operation image GC1. The web storage may be a session storage but is preferably a local storage. In the case where a local storage is used, even after the web browser is ended, a setting item corresponding to the operation history information D2 can be displayed the next time the web browser is started.

The control unit 105 is a processing device having a function of controlling each part of the terminal device 100 and a function of processing various data. The control unit 105 includes, for example, a processor such as a CPU (central processing unit). The control unit 105 executes the program stored in the storage unit 104 and thus implements various functions. The control unit 105 may be formed of a single processor or a plurality of processors. A part or all of the functions of the control unit 105 may be implemented by hardware such as a DSP (digital signal processor), ASIC (application-specific integrated circuit), PLD (programmable logic device), or FPGA (field-programmable gate array).

Based on the execution of the display program P2, the control unit 105 causes the display unit 102 to display the first operation image GC1 or the second operation image GC2, using the display information D3 or D4 from the display device 10. The control unit 105 also generates the operation information D1 based on an operation on the operation unit 103. The control unit 105 causes the communication unit 101 to transmit the operation information D1. At this time, the control unit 105 stores the operation information D1 along with the chronological information such as time information, as the operation history information D2, in the storage unit 104.

Figure 3:
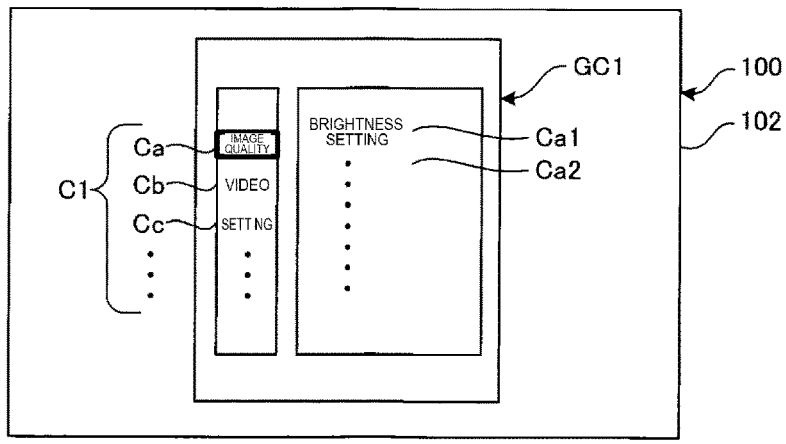
FIG. 3 illustrates a first operation image displayed at a terminal device in the first embodiment.
Figure 4:
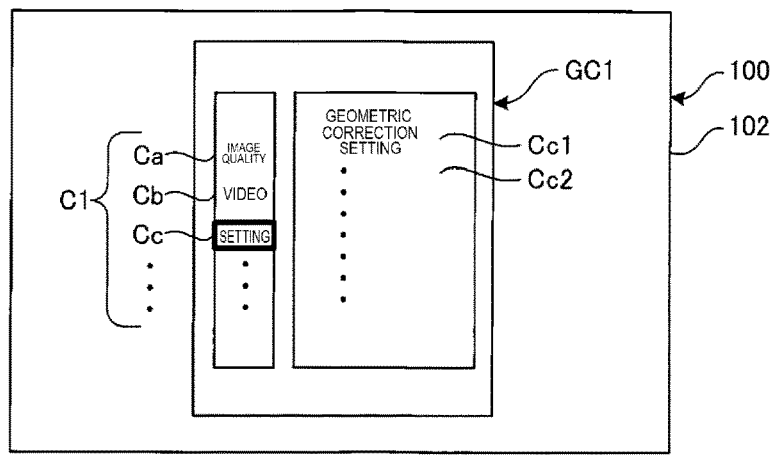
FIG. 4 illustrates the first operation image displayed at the terminal device in the first embodiment.

FIGS. 3 and 4 illustrate the first operation image GC1 displayed at the terminal device 100 in the first embodiment. The first operation image GC1 shown in FIGS. 3 and 4 is a display example where the operation history information D2 does not exist. This first operation image GC1 has a display area C1 including a plurality of menus Ca, Cb, and Cc or the like. The menu Ca is a menu for a setting about image quality adjustment of a display video at the display device 10. The menu Cb is a menu for a detailed setting of the display video at the display device 10. The menu Cc is a menu for various other settings of the display device 10. These menus selectively displayed in response to an operation at the operation unit 103.

FIG. 3 illustrates the state where the menu Ca is selected. In this state, a plurality of setting items Ca1 and Ca2 are displayed as an example of a sub-menu. FIG. 4 illustrates the state where the menu Cc is selected. In this state, a plurality of setting items Cc1 and Cc2 are displayed as an example of a sub-menu.

Figure 5:
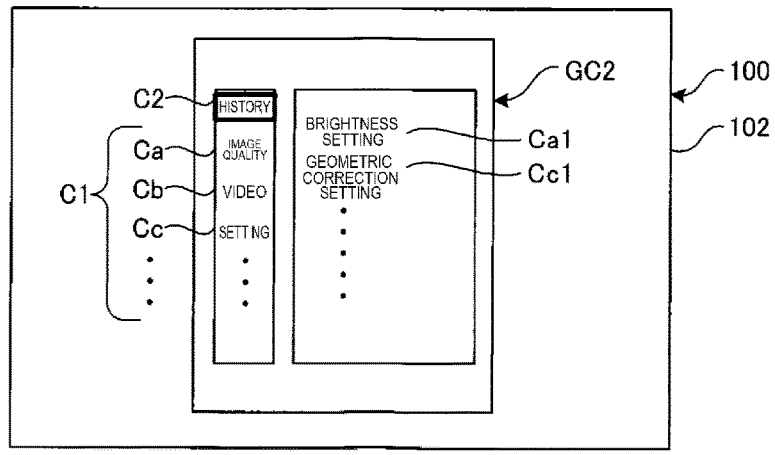
FIG. 5 illustrates a second operation image displayed at the terminal device in the first embodiment.

FIG. 5 illustrates the second operation image GC2 displayed at the terminal device 100 in the first embodiment. The second operation image GC2 shown in FIG. 5 is a display example after an operation to the first operation image GC1 and is displayed after the first operation image GC1 is used. For example, the menu C2 is displayed using the operation history information D2 in the web storage. This second operation image GC2 has the menu C2 in addition to the display area C1. The menu C2 is a menu for setting a setting item based on a history of an operation to the first operation image GC1. In the second operation image GC2, the menus Ca, Cb, Cc, and C2 are selectively displayed in response to an operation at the operation unit 103.

FIG. 5 illustrates the state where the menu C2 is selected. In this state, a plurality of setting items Ca1 and Cc1 are displayed an example of a sub-menu. For example, the sub-menu of the menu C2 is displayed, using the display information D4 generated using the CGI program of the display device 10. In addition to the same setting item as the history of the operation to the first operation image GC1, a setting item associated with or similar to this history may be displayed as the sub-menu of the menu C2. The order in which the plurality of setting items are displayed as the sub-menu of the menu C2 is, for example, the time-series order or the order according to the frequency of use, based on the operation history information D2.

1-3. Operation of Display System

Figure 6:
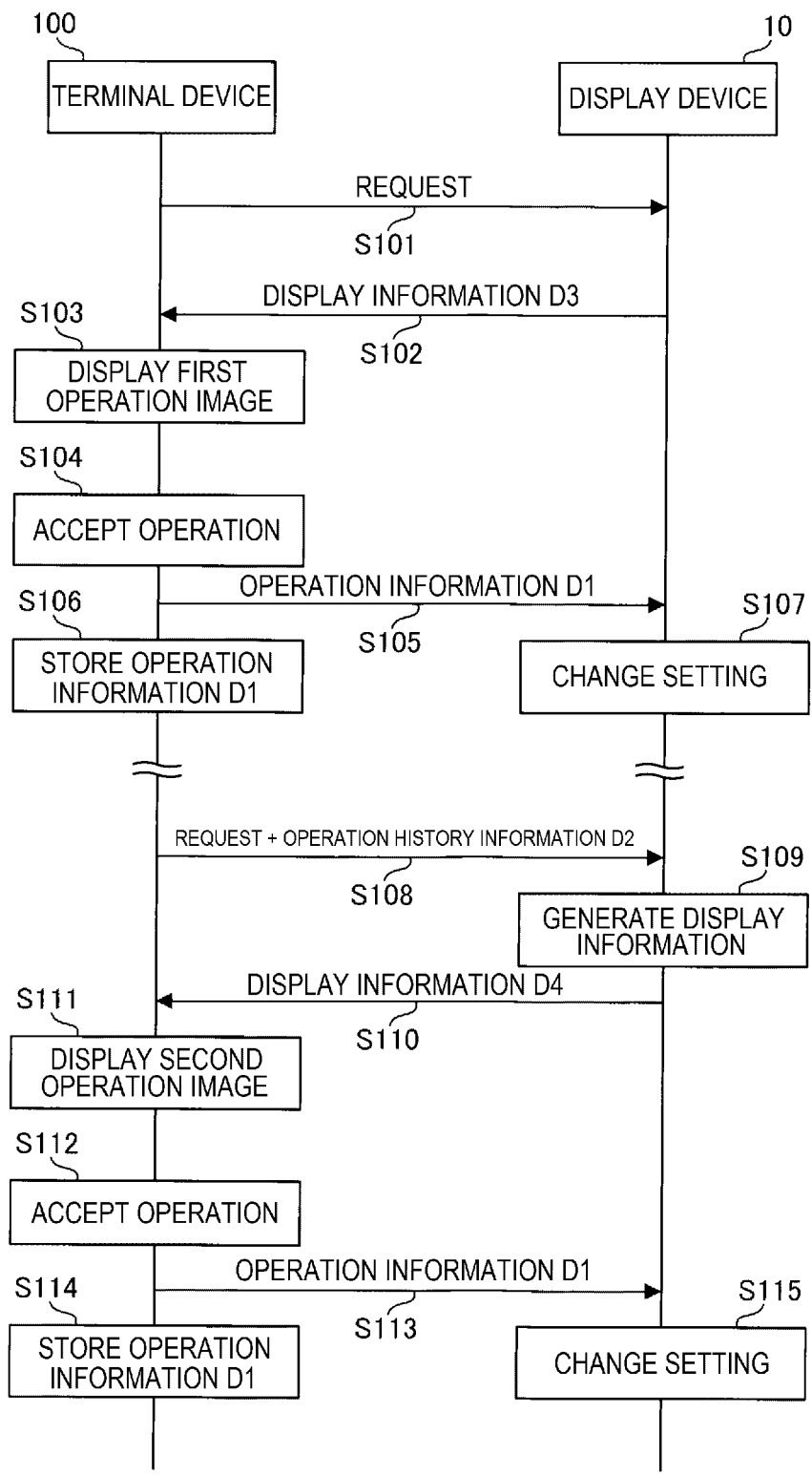
FIG. 6 shows an operation of the display system according to the first embodiment.

FIG. 6 shows an operation of the display system 1 according to the first embodiment. In the display system 1, as shown in FIG. 6, first in step S101, the terminal device 100 requests the display information D3 from the display device 10. For example, when the display information D3 is in the HTML format, this request is made, for example, by inputting a predetermined address to the web browser started by the terminal device 100.

The display device 10 transmits the display information D3 to the terminal device 100 in step S102. On receiving the display information D3, the terminal device 100 displays the first operation image GC1 in step S103. The terminal device 100 accepts an operation to the first operation image GC1 in step S104, then transmits the operation information D1 to the display device 10 in step S105, and stores the operation information D1 as the operation history information D2 in the storage unit 104 in step S106. On receiving the operation information D1, the display device 10 changes a setting in step S107.

When the operation history information D2 is stored in the storage unit 104 using the web storage, the terminal device 100 additionally displays the menu C2 in the first operation image GC1, using the operation history information D2.

Subsequently, as the terminal device 100 requests the display information D4 from the display device 10 in step S108, the display device 10 generates the display information D4 in step S109. For example, when the display information D4 is in the HTML format, this request is made, for example, by inputting a predetermined address to the web browser started by the terminal device 100, as in the foregoing step S101. When the operation history information D2 is stored in the storage unit 104 using the web storage, this request is also made by an operation to the menu C2 additionally displayed in the first operation image GC1. When the terminal device 100 requests the display information D4 from the display device 10, the terminal device 100 transmits the operation history information D2 to the display device 10. The display device 10 generates the display information D4 using the operation history information D2. For example, the display device 10 performs HTML parsing within the CGI based on the operation history information D2, prepares a page including a setting item about the sub-menu of the menu C2, and adds the prepared page to the display information D3, thus generating the display information D4.

On receiving the display information D4, the terminal device 100 displays the second operation image GC2 in step S111. The terminal device 100 accepts an operation to the second operation image GC2 in step S112, then transmits the operation information D1 to the display device 10 in step S113, and stores the operation information D1 as the operation history information D2 in the storage unit 104 in step S114. On receiving the operation information D1, the display device 10 changes a setting in step S115.

Subsequently, the foregoing steps S108 to S115 are repeated. Here, it can be said that, of two consecutive second operation images GC2, the second operation image GC2 that comes first is equivalent to the "first operation image" and that the second operation image GC2 that comes second is equivalent to the "second operation image".

As described above, the display system 1 includes the display device 10 displaying the image G on the screen SC as a display surface, and the terminal device 100 communicably coupled to the display device 10. The terminal device 100 displays the first operation image GC1 or the second operation image GC2 for a setting of the display device 10. The terminal device 100 has the storage unit 104 storing the operation history information D2, which is history information about an operation to the first operation image GC1. The display device 10 has the receiving unit 21 receiving the operation history information D2 from the terminal device 100, the generation unit 72 generating the display information D4 used to display the second operation image GC2, using the operation history information D2, and the transmitting unit 22 transmitting the display information D4 to the terminal device 100.

A method for controlling the display system 1 or the display device 10 includes: causing the display device 10 to receive the operation history information D2 from the terminal device 100; causing the display device 10 to generate the display information D4 using the operation history information D2; and transmitting the display information D4 from the display device 10 to the terminal device 100.

In the method for controlling the display system 1, the display device 10, or one of these, the operation history information D2 about an operation to the first operation image GC1 is received from the terminal device 100 displaying the first operation image GC1 for a setting of the display device 10. Therefore, the number of devices used is smaller than in the case where the history information is received from a separate device that does not display the first operation image GC1.

In the display system 1, the operation history information D2 is stored in the storage unit 104 of the terminal device 100. Therefore, even when the terminal device 100 is coupled to a different display device other than the display device 10, the second operation image GC2 can be similarly displayed at the terminal device 100. That is, even when the one terminal device 100 is shared among a plurality of display devices, a common operation can be carried out via the second operation image GC2.

The display information D4 used to display the second operation image GC2 for a setting of the display device 10 is generated using the operation history information D2, and the display information D4 is transmitted to the terminal device 100. Therefore, the display device 10 can display the second operation image GC2 based on the operation history information D2. Thus, the operation load for a setting of the display device 10 can be reduced, compared with the case where the first operation image GC1 is used as it is.

Specifically, the first operation image GC1 includes a plurality of setting items Ca1, Ca2, Cc1, and Cc2 or the like that are different from each other. The second operation image GC2 includes one or more setting items selected form the plurality of setting items Ca1, Ca2, Cc1, and Cc2 or the like, based on the operation history information D2. Therefore, the display device 10 can display a suitable second operation image GC2 based on the operation history information D2 about an operation to the first operation image GC1.

The one or more setting items included in the second operation image GC2 include a setting item that is the same as or associated with the setting item represented by the operation history information D2. Therefore, the display device 10 can display a suitable second operation image GC2 based on the operation history information D2 about an operation to the first operation image GC1.

2. Second Embodiment

A second embodiment will now be described. This embodiment is similar to the first embodiment except that the content of the display information D4 varies depending on whether the multi-projection function is used or not. In the description below, the second embodiment is described mainly in terms of the difference from the first embodiment, and similar matters are not described. In each drawing used for the description of the second embodiment, configurations similar to those in the first embodiment are denoted by the same reference signs.

Figure 7:
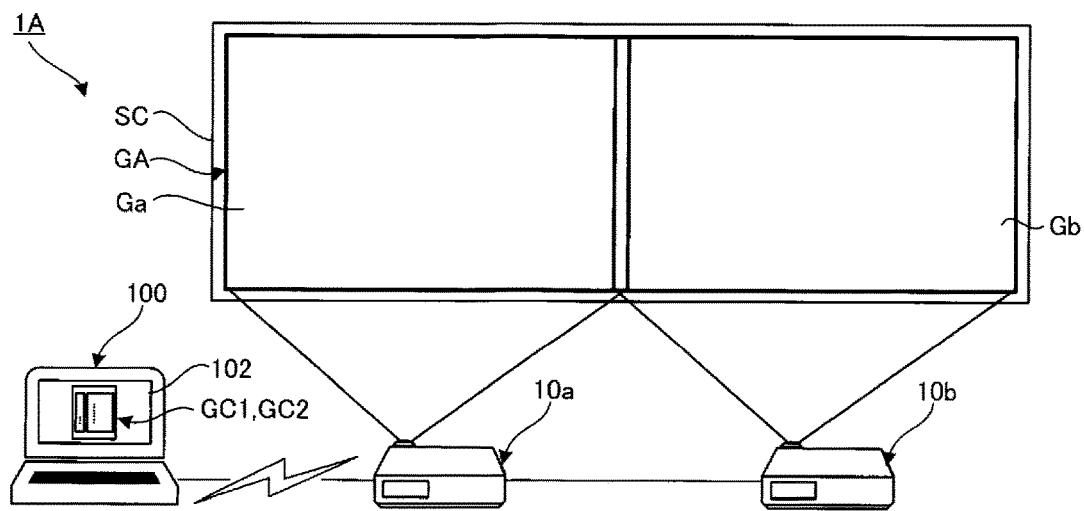
FIG. 7 schematically shows the external appearance of a display system according to a second embodiment.

FIG. 7 schematically shows the external appearance of a display system 1A according to the second embodiment. The display system 1A is a system having the multi-projection function. As shown in FIG. 7, the display system 1A has display devices 10a and 10b, and the terminal device 100. The display device 10a displays an image Ga on the screen SC. The display device 10b is communicably coupled to the display device 10a and displays an image Gb on the screen SC. In the display system 1A, there are cases where the display device 10a singly performs a display, and where the display device 10a performs a display simultaneously with the display device 10b.

When the display device 10a singly performs a display, the image Ga similar to the image G in the first embodiment is displayed on the screen SC. Meanwhile, when the display devices 10a and 10b simultaneously perform a display, that is, when the multi-projection function is used, an image GA, which is a combination of the images Ga and Gb, is displayed on the screen SC. The image GA has a part where the image Ga and the image Gb partly overlap each other. In this part, edge blending correction is performed, which is the processing to make the seam between the image Ga and the image Gb less visible. In the example shown in FIG. 7, the display device 10a functions as a master and the display device 10b functions as a slave. The number of display devices provided in the display system 1A is not limited to two and may be three or more. In such a case, for example, the plurality of display devices are daisy-chained.

Figure 8:
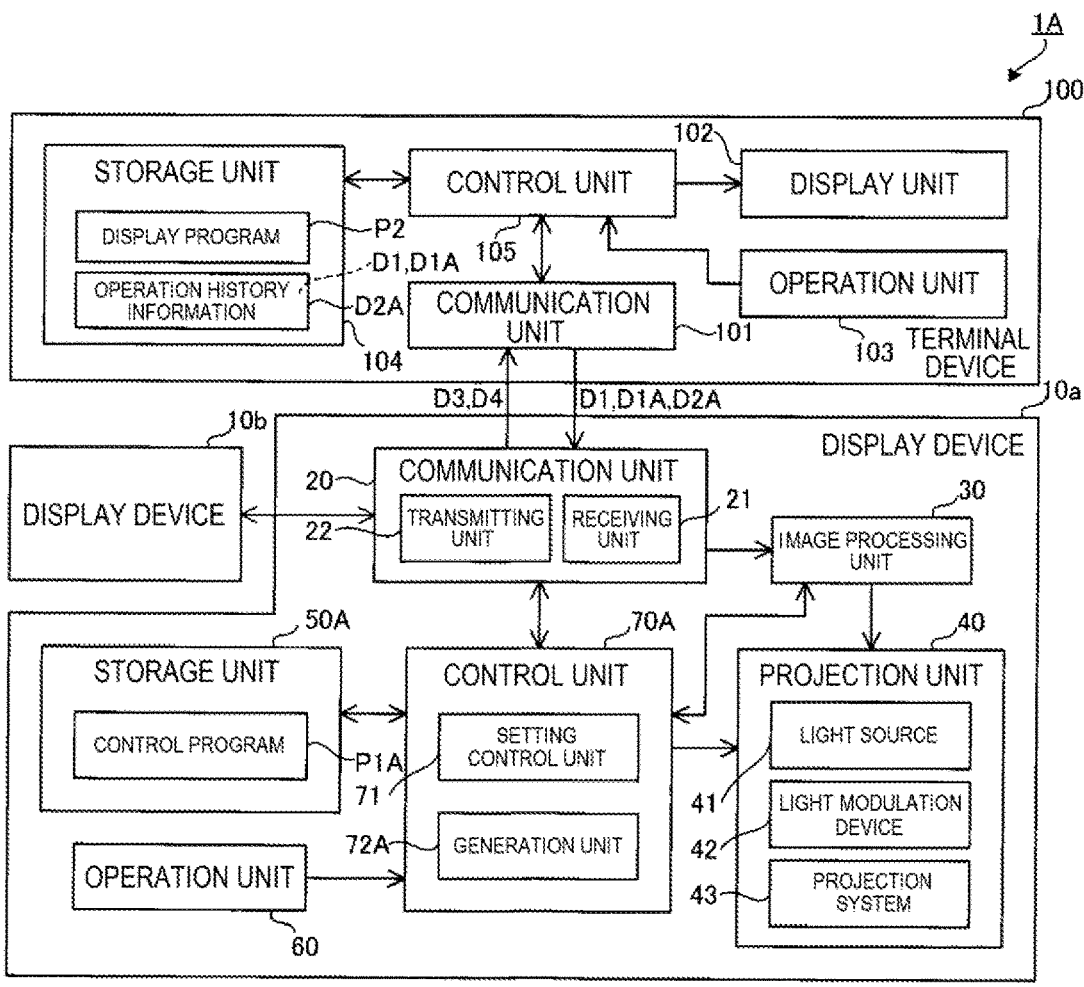
FIG. 8 shows the configuration of the display system according to the second embodiment.

FIG. 8 shows the configuration of the display system 1A according to the second embodiment. As shown in FIG. 8, the display device 10a is similar to the display device 10 in the first embodiment except that the display device 10a has a storage unit 50A and a control unit 70A instead of the storage unit 50 and the control unit 70 in the first embodiment. The storage unit 50A is similar to the storage unit 50 in the first embodiment except that the storage unit 50A stores a control program P1A instead of the control program P1 in the first embodiment. The control unit 70A is similar to the control unit 70 in the first embodiment except that the control unit 70A executes the control program P1A instead of the control program P1 in the first embodiment. The display device 10b functions as a slave when the multi-projection function is used. The display device 10b is configured similarly to the display device 10a except that the display device 10b does not generate the display information D3 and D4.

The control unit 70A executes the control program P1A and thus functions as the setting control unit 71 and a generation unit 72A. The generation unit 72A generates the display information D3 or D4. However, the generation unit 72A changes the content of the display information D4 between when the display device 10a singly performs a display and when the display device 10a performs a display simultaneously with the display device 10b. For example, when the display device 10a performs a display simultaneously with the display device 10b, an edge blending correction setting, which is a setting item about edge blending correction, is displayed as the content of the display information D4. Meanwhile, when the display device 10a singly performs a display, the edge blending correction setting is not displayed as the content of the display information D4.

In this embodiment, when the display device 10a singly performs a display, the terminal device 100 transmits the operation information D1 about an operation to the first operation image GC1, to the display device 10a, and also stores the operation information D1 in the storage unit 104. When the display devices 10a and 10b simultaneously perform a display, the terminal device 100 transmits operation information D1A about an operation to the first operation image GC1, to the display device 10a, and also stores the operation information D1A in the storage unit 104. Therefore, operation history information D2A including one or both of the operation information D1 and D1A is stored in the storage unit 104.

Figure 9:
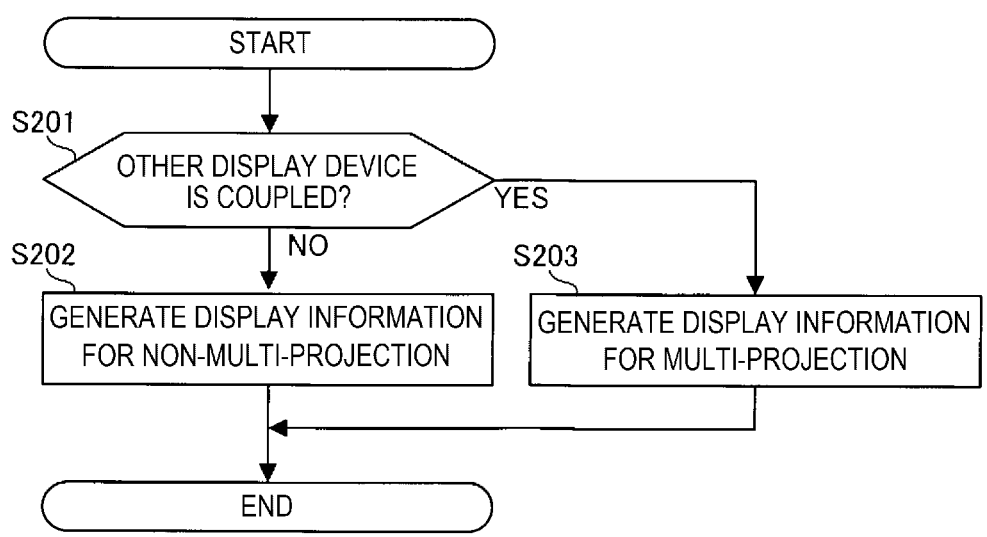
FIG. 9 is a flowchart showing the generation of display information in the second embodiment.

FIG. 9 is a flowchart showing the generation of the display information D4 in the second embodiment. As shown in FIG. 9, first in step S201, the generation unit 72A determines whether the other display device 10b is coupled to the display device 10a or not. When the display device 10b is not coupled, the generation unit 72A generates the display information D4 using the operation information D1 included in the operation history information D2A, in step S202. Thus, the second operation image GC2 based on the history of the operation to the first operation image GC1 in the case where the display device 10a singly performs a display can be displayed. That is, in this case, the second operation image GC2 not including the edge blending correction setting can be displayed, as in the first embodiment.

Meanwhile, when the display device 10b is coupled, the generation unit 72A generates the display information D4 using the operation information D1A included in the operation history information D2A, in step S203. Thus, the second operation image GC2 based on the history of the operation to the first operation image GC1 in the case where the display devices 10a and 10b simultaneously perform a display can be displayed. That is, in this case, the second operation image GC2 including the edge blending correction setting can be displayed.

As described above, the generation unit 72A changes the content of the display information D4 between when the other display device 10b is coupled to the network to which the terminal device 100 and the display device 10a are coupled and when the display device 10b is not coupled to the network. Therefore, in this embodiment, in addition to effects similar to those of the first embodiment, the second operation image GC2 including a setting item suitable for each of the case where the multi-projection function is used and the case where the multi-projection function is not used can be displayed at the terminal device 100.

3. Modification Examples

The method for controlling the display device, the display device, the method for controlling the display system, and the display system according to the present disclosure have been described above, based on the illustrated embodiments. However, the present disclosure is not limited to these embodiments. The configuration of each part according to the present disclosure can be replaced by an arbitrary configuration that achieves a function similar to that in the embodiments, and an arbitrary configuration can be added thereto. Also, arbitrary configurations in the embodiments may be combined together.

In the embodiments, the case where the second operation image GC2 includes the entire content of the first operation image GC1 is described. However, the second operation image GC2 may not include a setting item of the first operation image GC1. In this case, the second operation image GC2 may be provided with a separate menu for displaying the setting item of the first operation image GC1.

The setting items included in the first operation image GC1 and the second operation image GC2 in the embodiments are an example and not limiting. The first operation image GC1 and the second operation image GC2 may differ from each other in size, position or shape or the like.

What is claimed is:

1. A method for controlling a display device, the method comprising
receiving history information at the display device about an operation to a first operation image for a setting of the display device, from a terminal device configured to display the first operation image, wherein the first operation image includes a plurality of setting items that are different from each other;
generating display information used to display a second operation image for a setting of the display device, using the history information, wherein the second operation image includes one or more setting items selected from the plurality of setting items, based on the history information, wherein a content of the display information includes an edge blending correction setting when another display device is coupled to a network to which the terminal device and the display device are coupled, and wherein the content of the display information does not include the edge blending correction setting when another display device is not coupled to the network to which the terminal device and the display device are coupled; and
transmitting the display information to the terminal device from the display device.

2. The method for controlling the display device according to claim 1, wherein a content of the display information is changed between when another display device is coupled to a network to which the terminal device and the display device are coupled and when another display device is not coupled to the network.

3. The method for controlling the display device according to claim 1, wherein
the one or more setting items include a setting item that is the same as or associated with a setting item represented by the history information.

4. A display device comprising:
one or more processors programmed to implement one or more functions, the one or more functions comprising:
receiving history information about an operation to a first operation image for a setting of the display device, from a terminal device configured to display the first operation image, wherein the first operation image includes a plurality of setting items that are different from each other;
generating display information used to display a second operation image for a setting of the display device, using the history information, wherein the second operation image includes one or more setting items selected from the plurality of setting items, based on the history information, wherein a content of the display information includes an edge blending correction setting when another display device is coupled to a network to which the terminal device and the display device are coupled and wherein the content of the display information does not include the edge blending correction setting when another display device is not coupled to the network to which the terminal device and the display device are coupled; and
transmitting the display information to the terminal device.

5. The display device according to claim 4, wherein the functions further comprise:
changing a content of the display information between when another display device is coupled to a network to which the terminal device and the display device are coupled and when another display device is not coupled to the network.

6. The display device according to claim 4, wherein the one or more setting items include a setting item that is the same as or associated with a setting item represented by the history information.

7. A display system comprising:
a display device displaying an image on a display surface; and
a terminal device communicably coupled to the display device and displaying a first operation image or a second operation image for a setting of the display device, wherein
the terminal device includes:
a memory storing history information about an operation to the first operation image, and
one or more processors programmed to:

receive the history information from the terminal device, wherein the first operation image includes a plurality of setting items that are different from each other;

generate display information used to display the second operation image, using the history information, wherein the second operation image includes one or more setting items selected from the plurality of setting items, based on the history information, wherein a content of the display information includes an edge blending correction setting when another display device is coupled to a network to which the terminal device and the display device are coupled, and wherein the content of the display information does not include the edge blending correction setting when another display device is not coupled to the network to which the terminal device and the display device are coupled; and transmit the display information to the terminal device.

8. The display system according to claim 7, wherein the one or more processors are programmed to:

change a content of the display information between when another display device is coupled to a network to which the terminal device and the display device are coupled and when another display device is not coupled to the network.

9. The display system according to claim 7, wherein the one or more setting items include a setting item that is the same as or associated with a setting item represented by the history information.

* * * * *